United States Patent [19]

Stebbins

[11] Patent Number: 5,698,952
[45] Date of Patent: Dec. 16, 1997

[54] METHOD AND APPARATUS FOR DIRECT CURRENT PULSED IONIZATION LIGHTING

[76] Inventor: Russell T. Stebbins, 823 Dawson Ct., Redding, Calif. 96003

[21] Appl. No.: 679,937

[22] Filed: Jul. 15, 1996

Related U.S. Application Data

[63] Continuation-in-part of Ser. No. 412,469, Mar. 29, 1995, abandoned.

[51] Int. Cl.$^6$ .................................................. H05B 41/38
[52] U.S. Cl. ..................... 315/307; 315/289; 315/DIG. 4; 315/308; 315/151
[58] Field of Search ................................. 315/307, 289, 315/151, 246, 309, 291, 308, DIG. 4; 323/266, 224; 250/210, 206

[56] References Cited

U.S. PATENT DOCUMENTS

| | | | |
|---|---|---|---|
| 3,681,654 | 8/1972 | Quinn | 315/151 |
| 4,012,663 | 3/1977 | Soileau | 315/151 |
| 4,101,809 | 7/1978 | Morais | 315/156 |
| 4,234,820 | 11/1980 | Widmayer | 315/152 |
| 4,682,084 | 7/1987 | Kuhnel et al. | 315/307 |
| 4,914,356 | 4/1990 | Cockram | 315/307 |
| 5,027,034 | 6/1991 | Ruby et al. | 315/106 |
| 5,030,887 | 7/1991 | Guisinger | 315/158 |
| 5,381,077 | 1/1995 | McGuire | 315/247 |

FOREIGN PATENT DOCUMENTS

| | | |
|---|---|---|
| 241279 | 10/1987 | European Pat. Off. . |
| 450831 | 10/1991 | European Pat. Off. . |
| 9203898 | 3/1992 | WIPO ................. 315/307 |

*Primary Examiner*—Robert Pascal
*Assistant Examiner*—Arnold Kinkead
*Attorney, Agent, or Firm*—John P. O'Banion

[57] ABSTRACT

A method and apparatus for ionizing a rare gas in a gas type cold cathode lighting source using a high voltage direct current pulse. Direct current pulses are applied to the lighting source, the current flow to the lighting source is sensed, upon ionization of the gas the voltage level of the pulse is reduced and the pulse width is increased so as to provide a proportionally increased constant current high voltage direct current pulsed output, and the polarity of the pulses to the light source is periodically reversed.

6 Claims, 15 Drawing Sheets

METHOD AND APPARATUS FOR DIRECT CURRENT PULSED IONIZATION LIGHTING

CROSS-REFERENCE TO RELATED APPLICATIONS

This application is a continuation-in-part of co-pending application Ser. No. 08/412,469 filed on Mar. 29, 1995 now abandoned.

BACKGROUND OF THE INVENTION

1. Field of the Invention

This invention pertaim generally to ionized gas type lighting devices, and more particularly to a cold cathode direct currein pulsed ionized lighting system.

2. Description of the Background Art

Fluorescent lamps, cold cathode lighting, hot cathode lighting, neon lamps and the like operate on the principle of ionizing a gas within a tramparent or translucent envelope. Two basic types of such devices exist; passive and active. Both types use alternating currein or a form thereof to ionize the gas.

Passive lighting devices use a ballast transformer having a coil wound around an iron core, and are typically rated at a line voltage of 120 volts, line frequency of 60 Hertz, and an operating temperature of 60° F. However, while more efficient than incandescent lighting, passive lighting devices cannot compensate for environmental changes such as input voltage, frequency, or temperature which are outside of nominal design parameters.

Passive lighting devices operating in cold cathode lighting systems are generally limited to indoor use or secondary lighting systems, such as neon signs and architectural cold cathode lighting systems, where a malfunction such as blinking or failing to light, is not critical. In addition, at low frequencies such as 60 Hertz, the iron cores and coils used in the ballasts are large and heavy. Further, the ballasts are prone to leaking oil and/or potting material while operating at high temperatures, as well as to emitting unpleasant odors.

Many of the same problems exist with hot cathode ballast transformers, with two exceptions. First, by adding low voltage filament windings to the secondary and placing filaments (hot cathodes) inside the fluorescent tube, the system will now operate at a lower temperature, such as 40° F. However, being passive, these ballasts are still subject to variations in line voltage and temperature. A higher than normal line voltage will cause a proportionally higher secondary ionization current and increase the light output and core loss due to the increased operating power and temperature. This decreases system efficiency as well as the average rated hours of life for gas tubes operating within this system. Conversely, a lower than normal line voltage and/or lower than normal ambient temperature will cause the system to blink or shut off altogether.

It is also known that gas has a fast response time, having an ability to switch from a fully ionized state (the "on" state) to a deionized state (the "off" state) typically in microseconds. Thus, a cold cathode light source will cycle on and off at whatever frequency the secondary is operating. In passive lighting devices, secondary ionization current ceases to flow for a portion of every cycle. Consequently, the light source is considered to be in the off state for a few milliseconds of every cycle, causing an on-off-on pattern to be transmitted optically from the light source.

Active devices, which are also referred to as solid state transformers or ballasts in the lighting industry and as constant current power supplies in the electronics industry, employ a high voltage, high frequency, core and coil transformer operating in the frequency range of approximately 10 kHz to 100 kHz. These devices utilize a form of pulse width or power modulation scheme with a flyback or forward converter stepping up the voltage through a transformer, and thus providing a high voltage AC output to ionize the gas within the light system. Upon ionization, the gas switches to a lower secondary impedance causing more current to flow in the primary. Current is then typically monitored and limited in the primary circuit for the purpose of providing for a regulated ionizing current in the secondary circuit so as to regulate the light output.

Active lighting devices are typically more efficient than passive devices, and are also able to accommodate and compensate for low and high input line voltages which are typically in the range of 85 to 135 volts AC. In addition, the upper end of the range may be extended to 277 volts AC by adding a boost regulator ahead of the switching circuitry. Hence, solid state ballasts are able to accommodate a wide range of AC line input voltages and frequencies. In addition, they are typically more efficient, and are smaller and lighter in weight than passive devices. However, such devices are not able to compensate for temperature changes. In addition, such devices transmit radio frequency (RF) energy which causes interference with hospital equipment, communications equipment, and radio, television and other receiving devices. Further, at the high frequencies at which these devices operate, current flows along the outside of the conductors and, therefore, the insulation over the wires acts as a dielectric and capacitively couples energy from the inner conductor to the outside surface of the wire. And, because of the risk of shorts or fire, the wires cannot safely be placed inside metal conducts or close to wood and other surfaces that may become conductive to high voltage, high frequency, alternating current when wet. Also, dimming is not practical because of the ambient temperature changes in the gas which cause the ionization voltage to change along with the light output characteristics.

As related above, use of AC presents significant problems in the operation of lighting systems. Further, it is known that the flickering caused by use of AC will cause nausea or even epileptic fits or seizures in some people.

Therefore, there is a need for a cold catode lighting system which can operate over a wide range of line voltages, frequencies and temperatures, which is small, lightweight and energy efficient, which can be used with lighting cables running in conduit, which does not produce RF interference, which can be dimmed and which does not flicker. The present invention satisfies those needs, as well as others, and overcomes deficiencies in heretofore known gas type lighting systems.

SUMMARY OF THE INVENTION

The present invention generally comprises a cold cathode light system wherin the ionizing gas in the lamp is ionized using a high voltage direct current pulse. By way of example, and not of limitation, direct current pulses are applied to the lamp, the current flow to the lamp is sensed, upon ionization of the gas the voltage level of the pulse is reduced and the pulse width is increased so as to provide a proportionally increased constant current high voltage direct current pulsed output, and the polarity of the pulses to the lamp is periodically reversed.

An object of the invention is to provide an apparatus which generates a direct current pulse which is variable in amplitude, width and polarity.

Another object of the invention is to provide for high voltage direct current pulse amplitude modulation, with the peak voltage modulation point being determined by, but not limited to, the wall temperature of the glass around the cathode area within a light source.

Another object of the invention is to provide a high voltage direct current pulse of sufficient amplitude to cause ionization of the gas within a light source at below 0 degrees Fahrenheit.

Another object of the invention is to limit the direct current pulse according to the amount of energy released in the specific wavelengths of the gas.

Another object of the invention is to eliminate energy related switching losses associated with ionizing the gas as in alternating current systems.

Another object of the invention is to provide for a unique high voltage pulse transformer with faster secondary rise times and less core loss due to the reduced inter-winding capacitance.

Another object of the invention is to provide a constantly ionized gas light source without alternating current being present within the ionized system or the wiring thereof and thus, without generating noise in the optical or the electromagnetic frequency bands.

Another object of the invention is to eliminate the dark areas found to be characteristic to direct current being present within the typical AC ionization of gas type lighting devices.

Another object of the invention is to convert photon energy to a simultaneous inversely proportional direct current pulse of electrical energy, current limited by photon energy release and/or temperature in real time.

Another object of the invention is to provide a constant light source regardless of normal ambient temperature changes.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
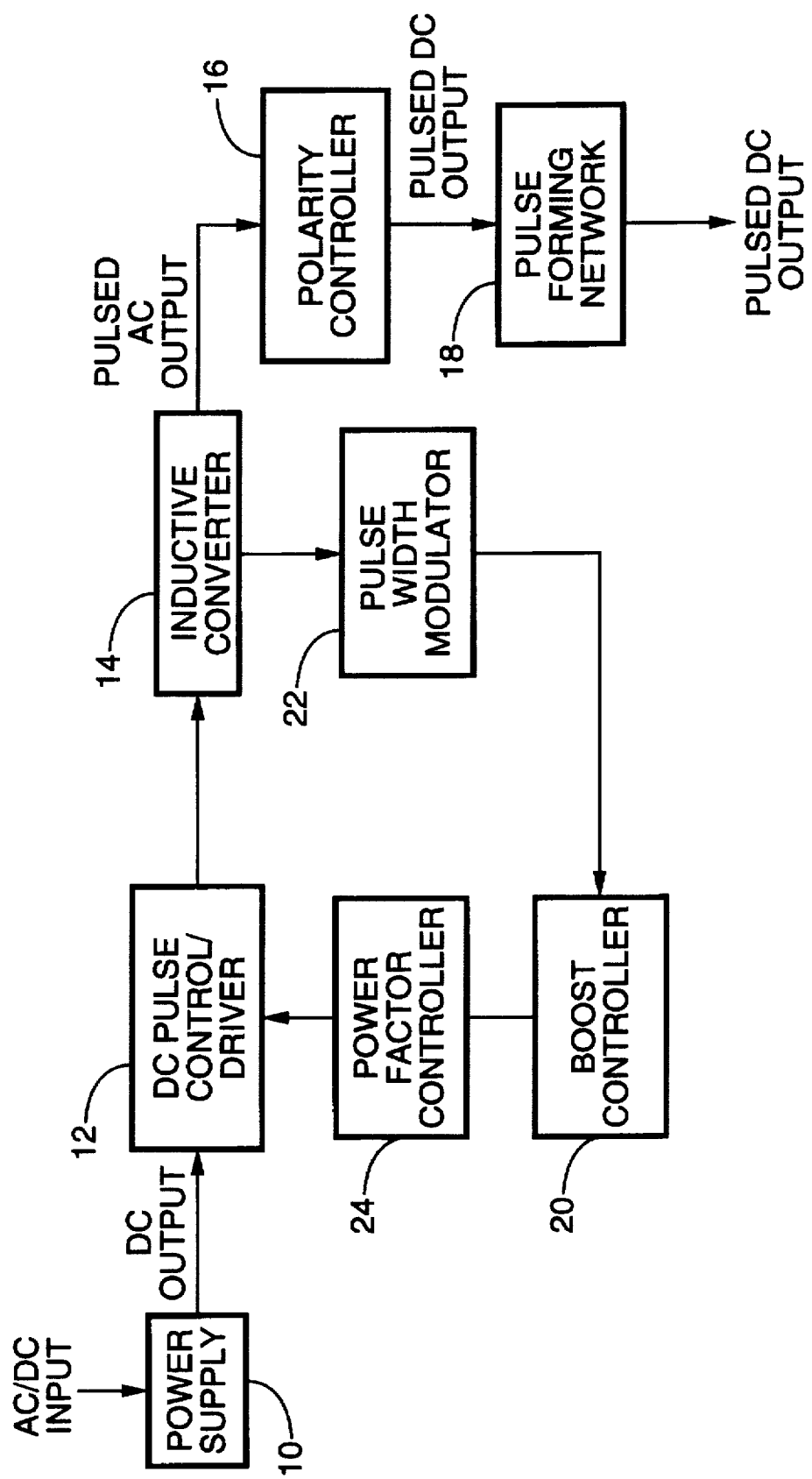
FIG. 1 is a functional block diagram of a direct current pulsed ionization lighting apparatus in accordance with the present invention.

Referring first to FIG. 1, a functional block diagram of a direct current pulsed ionization cold cathode lighting system in accordance with the present invention is shown. In the general configuration shown, the apparatus includes a direct current power supply 10 which converts an alternating current (AC) input voltage source to a direct current (DC) output. Alternatively, power supply 10 could accept a direct current input, in which case no conversion is necessary. The direct current output from power supply 10 feeds DC pulse control/driver 12 which drives inductive converter 14. The AC output of inductive converter 14 is then rectified by polarity controller 16 which is used to eliminate dark areas in the light source (not shown) and filtered by pulse forming network 18 so as to produce a high voltage pulsed direct current output. The resultant positive or negative direct current output pulses are then made available at the output of pulse forming network 18 for powering the light source.

The amount of current flowing through the primary inductor of inductive converter 14 is sensed by DC pulse control/driver 12 and, when sufficient current flows through the primary inductor to indicate secondary current flow from ionization of the gas in the light source, the voltage level of the pulses to the primary inductor is reduced to a level determined by boost controller 20. At the same time, the width of the pulses is increased by pulse width modulator 22, so as to provide a proportionally increased constant current high voltage DC pulsed output. Initially, the light source appears as an open circuit (pre-ionization). When ionization occurs, the light source appears as a closed circuit and current flows in inductive converter 14.

Additionally, a power factor controller 24, operating in conjunction with pulse width modulator 22, causes the width of the pulses from DC pulse control/driver 12 to decrease with increasing source input voltage, and causing the output pulse width to increase with decreasing source input voltage.

As result, a constant load is provided to the source input making the source input load appear resistive, and thus providing for power factor correction.

Operationally, the apparatus produces DC pulses having a sufficiently high voltage to cause ionization of the gas within the light source. The required voltage to cause ionization is generally dictated by the number of light sources being driven, such as approximately 6 kV for eight conventional fluorescent light sources. As soon as ionization of the gas occurs and current begins to flow, the pulse amplitude is reduced to a level sufficient to sustain photon emission.

Figure 2:
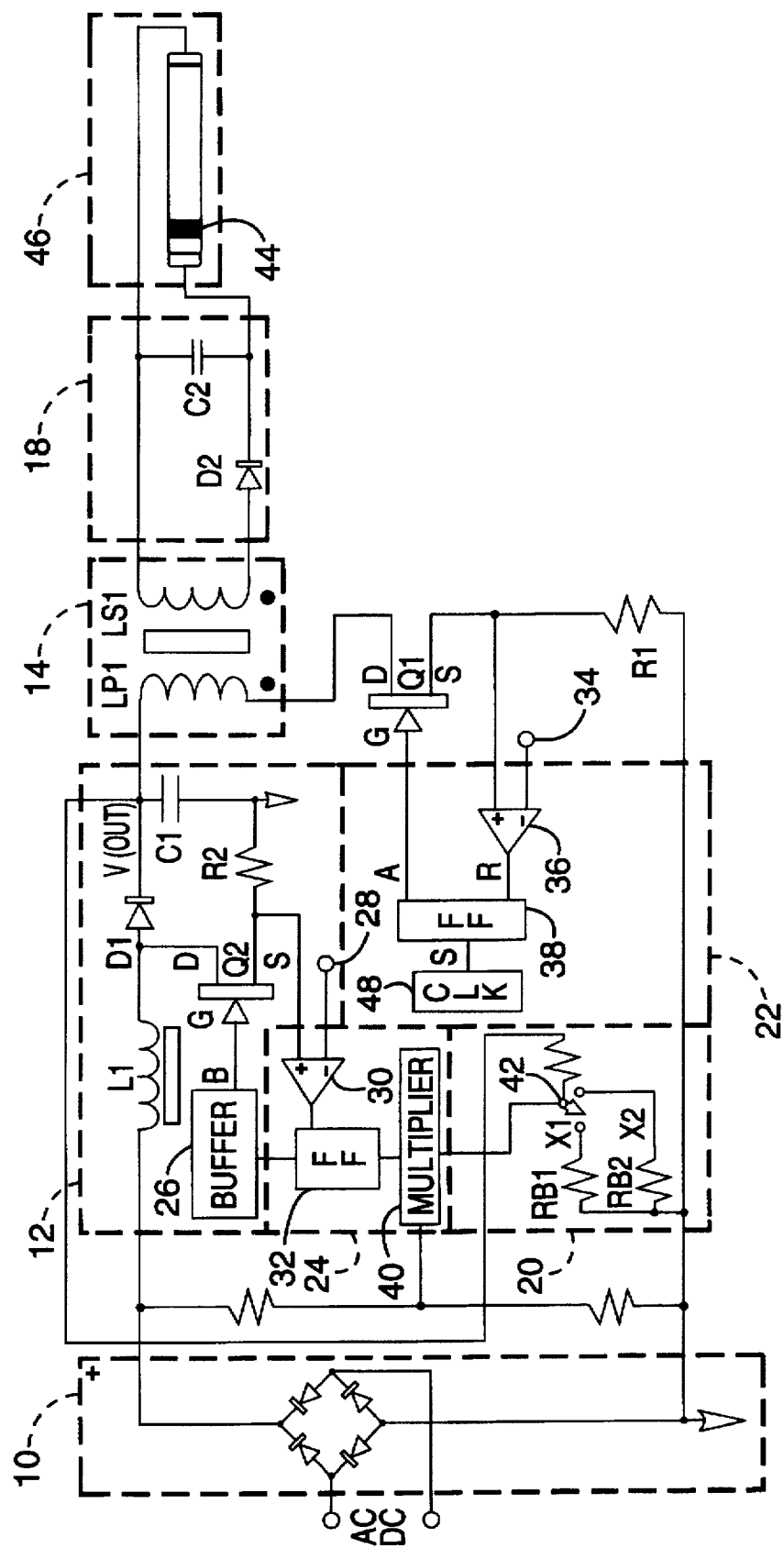
FIG. 2 is a schematic diagram of a first embodiment of an apparatus in accordance with the present invention.

FIG. 2 shows a schematic diagram of a basic embodiment of a direct current pulsed ionization lighting apparatus in accordance with the present invention which is illustrative of the basic concepts which are carried through to the further embodiments described herein. As can be seen, power supply 10 comprises a bridge rectifier circuit which converts a low voltage AC input source to direct current. Alternatively, the input voltage source can be direct current, in which case power supply 10 could be eliminated altogether if desired. As shown, the negative side of bridge rectifier circuit is common to the remaining circuitry in the apparatus and is so indicated with a down arrow. The positive side of the bridge rectifier is connected to DC pulse control/driver 12 so as to provide voltage to the drain of power MOSFET Q2 through a conventional inductor L1 (e.g., 900 µH, 1 kHz, 500 W) as well as to provide a bias voltage to power factor controller 24. Power factor controller 24 is typically a device such as a Motorola MC34262 or the like. The output of power factor controller 24 drives a high speed buffer 26 such as a Motorola MC4424 or the like which is used to provide high speed switching signals to the gate of Q2. Pulse width modulator 22 is typically a device such as a Silicon General SG3526 or the like. Pulse forming network 18 comprises a diode D2 and capacitor C2 as shown. Inductive convertor 14 is a "transformer" of the configuration shown in FIG. 14 and 15, which has been gapped for flyback and which utilizes only one primary and one secondary winding.

A reference voltage applied to the input 28 of power factor controller 24 is used to limit the current flowing through Q2 based on the voltage drop across the source resistor R2. For example, where resistor R2 has a value of 0.1 ohms, the reference voltage would be 1 volt to represent 10 amps of current. When the voltage drop across R2 exceeds the reference voltage, comparator 30 produces a logic high which resets flip flop 32 and terminates the output of power factor controller 24. As a result, no gate drive is applied to Q2 and it turns off. Further, each output pulse is current limited by comparing the voltage drop across resistor R1 in pulse width modulator 22 with a reference voltage applied to input 34. When the voltage drop across source resistor R1 exceeds the reference voltage on input 34, comparator 36 produces a logic high which resets flip flop 38 and terminates drive voltage to the gate of Q1 thereby terminating the pulse. The reference voltage applied to input 34, therefore, determines the secondary ionization current limits, typically less than 0.2 amps, and is derived conventionally using the manufacturer's specifications for current and light output characteristics. Q1 and Q2 are power MOSFETS such as a Motorola MTH20N50 or the like.

Note also that, when source voltage is initially applied to power supply 10, flip flop 32 in power factor controller 24 is set high causing the gate drive on Q2 to go high and generating an "on" state. The drain of Q2 then switches low causing current to flow through source resistor R2, the source of Q2, the drain of Q2, and L1 with the current increasing (ramping up) with "on" time. Power factor correction is achieved utilizing the input voltage as bias to multiplier 40 in power factor controller 24 causing the output pulse width to decrease with increasing source input voltage, and causing the output pulse width to increase with decreasing source input voltage. As result, a constant load is provided to the source input making the source input load appear resistive and providing for power factor correction.

As indicated previously, upon ionization the amplitude of the DC pulses is reduced. In this embodiment, rather than an automatic reduction taking place, the reduction is shown as being controlled manually selecting position X1 or X2 with switch 42 to switch between resistors RB1 and RB2 which are coupled to multiplier 38 in power factor controller 24.

Further, dark areas 44 which might form in the light source 46 can be eliminated by reversing polarity to the light source. Such reversal can be effected by manually removing the light source exhibiting the dark area, rotating the light source end to end, and then replacing the light source.

Figure 3:
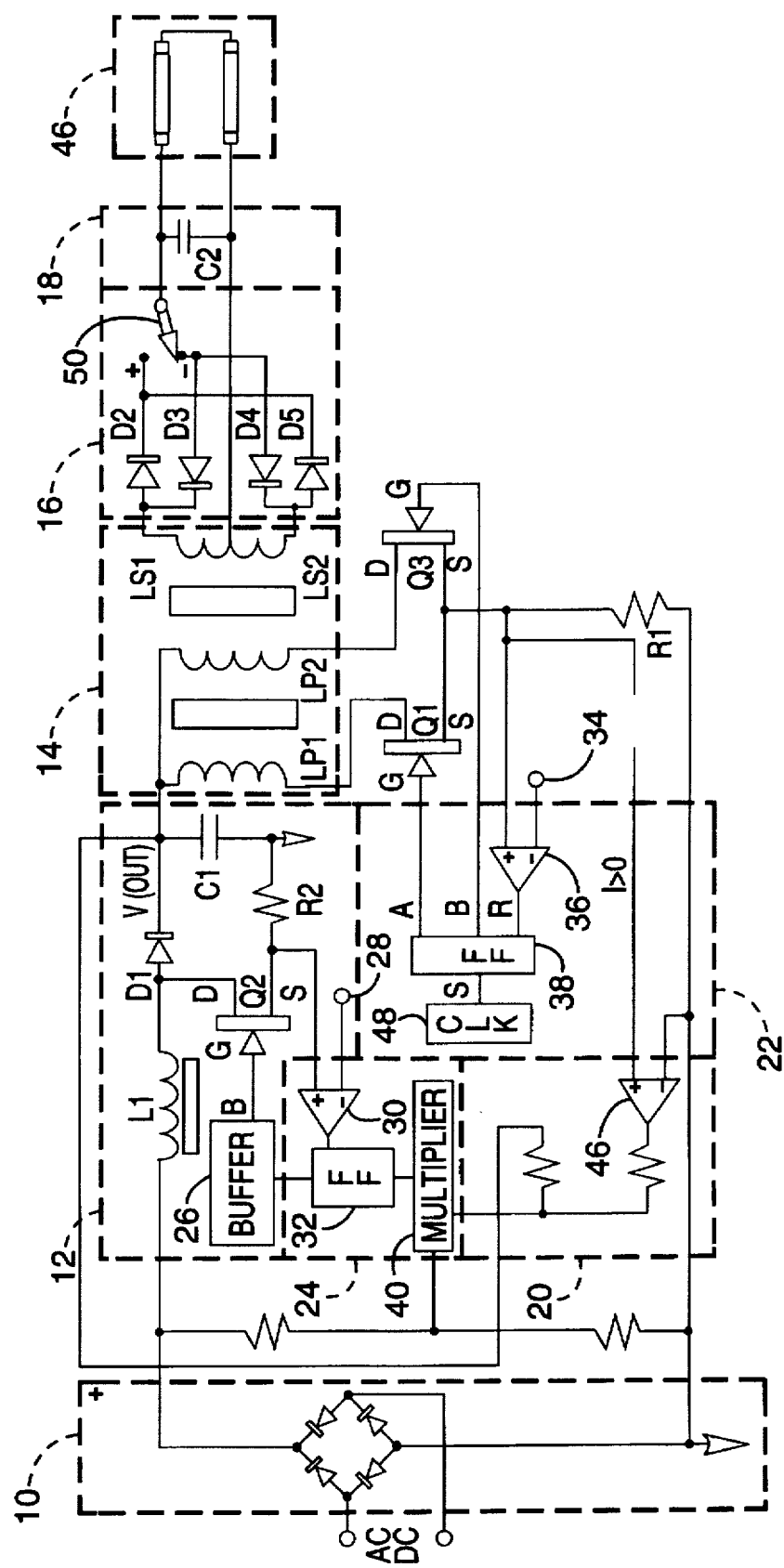
FIG. 3 is a schematic diagram of an alternative embodiment of an apparatus in accordance with the present invention showing an automatic boost controller and a manual polarity controller.

FIG. 3 shows a schematic diagram of an alternative embodiment of the present invention employing a more efficient push-pull switching circuit designed to provide the higher voltage and current required by pulse forming network 18 in order to develop a high voltage direct current pulse of sufficient energy to cause and maintain ionization at lower ambient temperatures. This embodiment also includes a manually operated polarity controller 16 for reversing polarity to correct any dark area conditions in light source 46. In addition, in this embodiment boost controller 20 operates automatically so as to provide a high voltage pulse during the non-ionized high impedance gas state and reduce the voltage during the ionized low impedance gas state.

As with the embodiment shown in FIG. 2, power supply 10 allows for an input source of AC or DC. Initially on power up, the internal flip flop 32 in power factor controller 24 is set high causing the gate drive on Q2 to go high and generating an "on" state. The drain of Q2 then switches low, thereby causing current to flow through source resistor R2, the source of Q2, the drain of Q2, and L1, with the current increasing (ramping up) with "on" time due to the magnetics. Power factor correction is achieved utilizing the input voltage as bias to multiplier 40 in power factor controller 24, thereby causing the output pulse width, or duty cycle, to decrease with increasing source input voltage, and causing the output pulse width to increase with decreasing source input voltage (e.g., at a frequency of 100 kHz typical). As result, a constant load is provided to the source input making the source input load appear resistive and providing for power factor correction.

Also, this circuit provides for a wide input voltage range while regulating the output voltage V(out) to specific values depending on the output state of the I>0 comparator 46 in boost controller 20. As can be seen, in this configuration boost controller 20 is a simple voltage divider which is operated by comparator 46 switching between a logic high and a logic low. Certain conditions will terminate the high (on) state, such as the end of the clock cycle as would be the case for low source input voltage causing a maximum duty cycle, or in the case of excessive current such as Q2 source resistor R2 current causing a voltage drop sufficient to exceed the reference voltage at input 28, in which case the output of comparator 30 switches high, thereby resetting flip flop 32 and thus terminating the gate drive to Q2 so that Q2 turns off. However, in normal operation the pulse width (e.g., Q2 on time) is inversely proportional with source input voltage, storing energy in the "on" state and releasing the energy in the "off" state, thus causing the drain to go high. This then allows the L1 voltage to increase in a positive direction to a multiple of the input source voltage, thus forward biasing diode D1 and charging capacitor C1 to a specific voltage, the value of which is dependent on the bias voltage to multiplier 40 (1 volt typical) for terminating said high (on) state.

Initially the high voltage pulsed direct current state is determined by a zero voltage drop across resistor R1 indicating a pre-ionization or high impedance state (e.g., open secondary). This is the condition for boosting V(out) so as to increase the primary (LP1) switching voltage and thus increase the secondary (LS1 and LS2) output voltage proportional to the step up ratio of inductive converter 14. This high voltage pulse causes the gas in light source 46 to ionize, thus lowering the impedance on the secondary of inductive converter 14 and causing current in the primary to flow through R1. Note that light source 46 is shown as having two tubes merely to illustrate that the invention is not limited to driving one tube, but can be used with a plurality of tubes.

When ionization takes place and current flows, a positive voltage drop across R1 generates an I>0 signal voltage, thus causing the output of comparator 46 to switch high so as to lower the duty cycle. In this way, a two-stage regulated constant voltage source is provided. The result is the apparatus switches output voltages between a pre-ionization gas state requiring higher output voltage and low secondary current and an ionized gas state requiring a lower output voltage and higher secondary current.

Further, because of the constant current characteristics of the push-pull configuration of inductive converter 14, a lower output voltage causes the pulse width modulator 22 to increase the pulse width in order to maintain a constant current, thereby increasing overall efficiency. Initially, clock 48 goes high causing flip flop 38 to set output "A" high. Thus the gate of Q1 is driven high, and the drain and LP1 primary are switched to low. This causes current to flow from common through R1, the source and drain of Q1, and LP1 to V(out). Q1 and Q3 source current will continue to ramp up until the end of clock cycle (as is the case with a high impedance secondary load), or when the current flow causes a sufficient voltage drop across R1 to exceed the reference voltage causing comparator 36 to switch high. In the latter event, flip flop 38 is reset to low, Q1 is turned off, and the cycle is repeated to form a push-pull stage which causes the secondary LS of inductive converter 14 to output a positive and a negative high voltage pulse. Further, each output pulse is current limited by comparing the voltage drop across R1 as core current ramps up over time until such time that the current causes sufficient positive voltage drop across R1 to equal the reference voltage on input 34, thereby causing comparator 36 to go high so as to reset flip flop 38 and drive the output low, thus terminating the pulse. It should be apparent at this point that the reference voltage applied to input 34 determines the secondary ionization current limit, which is typically less than 0.2 amps at worst case conditions such as low ambient temperatures. Therefore, the reference voltage applied to input 34 is derived conventionally using the manufacturer's specifications for florescent lamp current and light output characteristics.

Because light source 46 will operate more efficiently with the present invention, the actual light output will exceed the specified light output at the specified current (rated for AC systems). Therefore, with the present invention the actual peak current limits are lower than the manufacturer's specifications for providing a specified light output, the degree of which depends on the type of gas lamp. Accordingly, the secondary direct current limit (e. g., the specific voltage of the reference voltage applied to input 34 and value of R1) is defined to be that which causes photon emission (electron collisions) sufficient to produce the specified light output at low temperatures.

With Q1 and Q3 operating in push-pull with the primary of inductive converter 14 providing a positive and negative high voltage pulse at the secondary output, the secondary output is fed forward to polarity controller 16 and pulse forming network 18 which comprises fast diodes and a capacitor C2 for the purpose of rectifying and filtering the high voltage AC pulse to a high voltage pulsed DC direct current output. In the embodiment shown, polarity controller 16 comprises diodes which are manually switched using switch 50 to effect polarity reversal. Alternatively, polarity reversal could be effected by manually removing the light source exhibiting dark areas, rotating the light source end to end, and then replacing the light source as was described with regard to the embodiment of FIG. 2.

Figure 4:
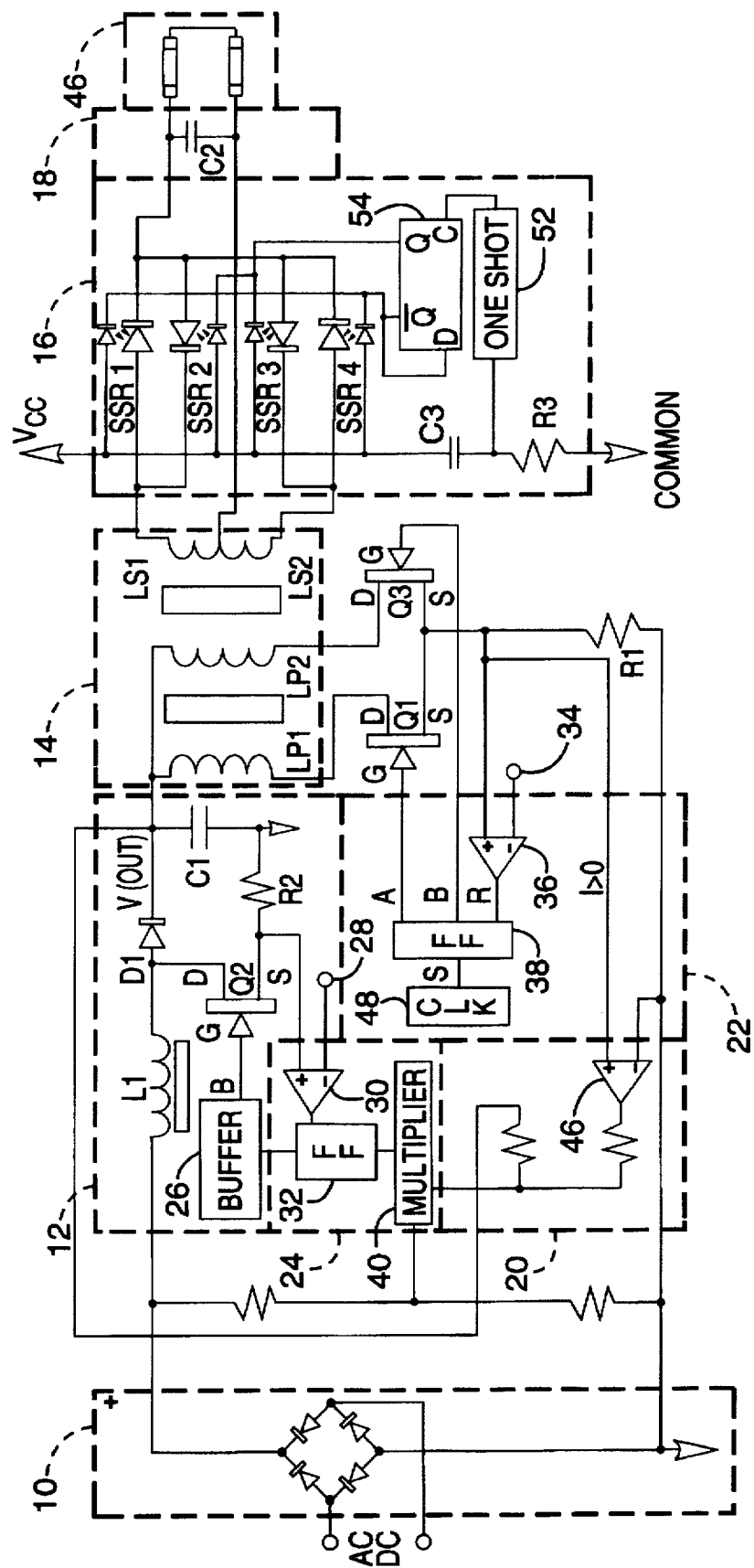
FIG. 4 is a schematic diagram of an alternative embodiment of the apparatus shown in FIG. 3 employing automatic polarity reversal on power up.

Referring now to FIG. 4, a modification to the embodiment of FIG. 3 is shown in which polarity controller 16 reverses polarity automatically on power up. With application of power, capacitor C3 and resistor R3 provide a trigger pulse to a negative going edge triggered one shot 52. One shot 52 outputs a pulse to a D-type flip flop 54 with its "not Q" output tied to the "D" input thus causing the outputs to toggle every time power is reapplied. The outputs are tied to "negative true" logic to the solid state relays (SSR), with "Q" high reverse biasing SSR2 and SSR3, and "not Q" low forward biasing SSR1 and SSR4, thus providing a positive high voltage pulse direct current output to capacitor C2 and light source 46 relative to the center tap. Conversely, toggling flip flop 54 provides for a negative high voltage pulse direct current output to capacitor C2 and the light source relative to the center tap.

At this point, it will be appreciated that the present invention is capable of ionizing the gas in the light source at low ambient temperatures and then maintaining ionization with constant current. The pulsed direct current ionization causes a unidirectional plasma flow and, therefore, a constant photon emission thus providing a stable light energy output. By employing photodiodes and fiber optics light guides or the like designed to operate at the specific frequencies of ultraviolet (blue) for argon (420 nm) in the case of fluorescent lamps, orange red (550 nm) for neon and so on, specific optical filters may be designed to accommodate any ionized gas at its peak optical output wavelength and used for sensing photon emission and infrared (1100 nm) peak optical output for real-time temperature sensing.

Figure 5:
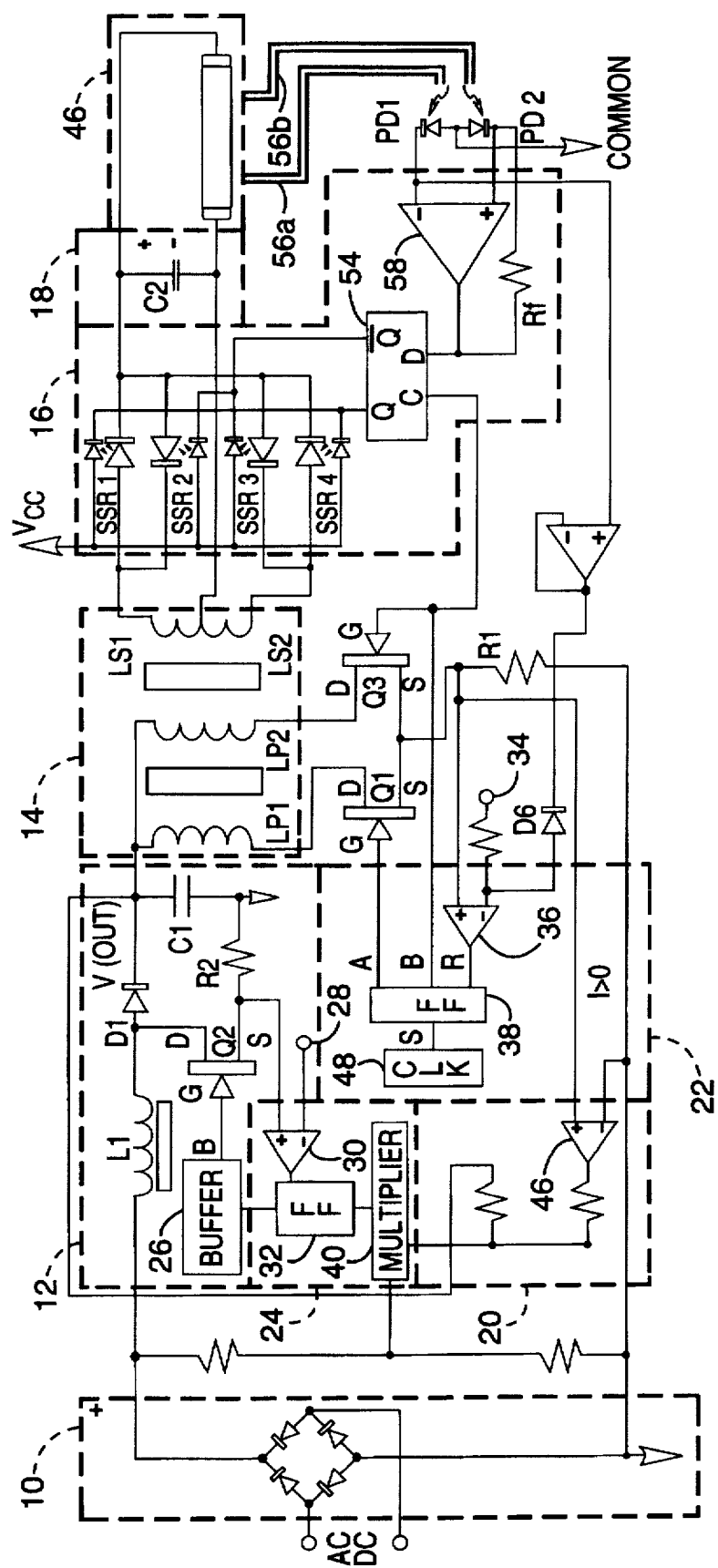
FIG. 5 is a schematic diagram of an alternative embodiment of the apparatus shown in FIG. 4 employing fiber optics and photodiodes for automatic polarity reversal.

Referring now to FIG. 5, an alternative embodiment to the automatic polarity reversal configuration of FIG. 4 is shown in which fiber optics and photodiodes are employed for automatic polarity reversal in the event one end of the light tube produces less photon and/or infrared energy than the other. This embodiment also current limits the high voltage direct current pulse relative to actual photon and/or infrared energy output. Here, the photodiodes are designed to operate at specific light frequencies. As shown, light from each end of the light source 46 is directed to photodiodes PD1 and PD2 by means of fiber optic cables 56a, 56b. Optical feedback is utilized to perform a polarity reversal by comparing the output of photodiodes PD1 and PD2 by means of a comparator 58. Where the output PD2 is higher than PD1 (more light, higher conduction, lower voltage drop), resistor Rf provides feedback thus forming a Schmitt trigger input causing the output to switch high so as to place a "1" into the "D" input of flip flop 54, clocking "D" to "Q" on the negative edge of the "B" output of flip flop 38 allowing polarity reversal to take place when Q1 and Q3 are off (zero voltage switching). A "Q" high state reverse biases SSR1 and SSR4 (positive output) and "not Q" switching low forward biases SSR2 and SSR3, thereby providing for a negative pulse output to light source 46 thus eliminating the dark area on the previously positive end, and remaining in this state until the now positive end becomes dark again, which may take place over a month, a year or never again during its lifetime.

Figure 6:
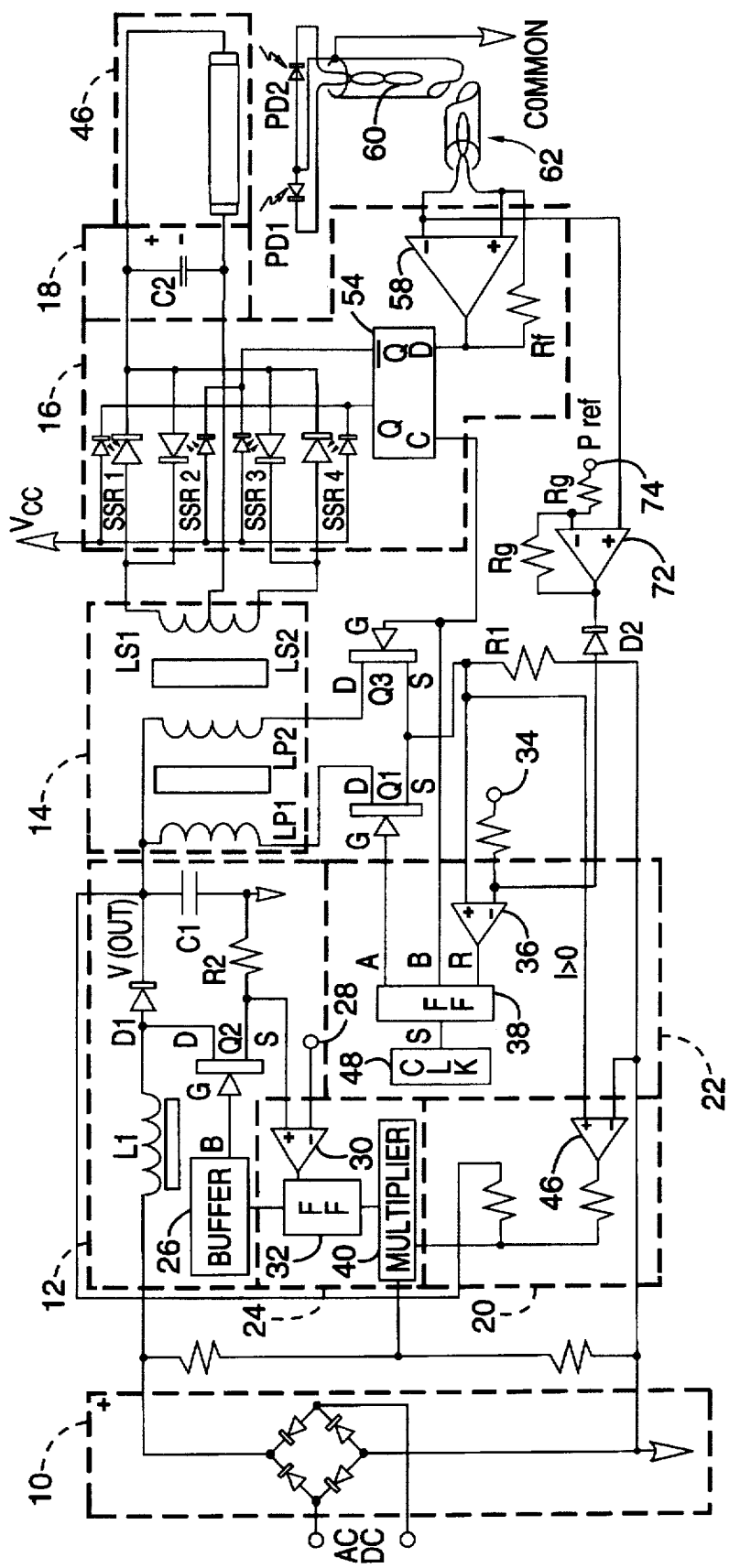
FIG. 6 is a schematic diagram of an alternative embodiment of the apparatus shown in FIG. 5 employing photodiodes and a twisted wire pair for automatic polarity reversal.

FIG. 6 shows an alternative to the embodiment shown in FIG. 5 in which the photodiodes PD1 and PD2 are located at the light source 46 and connected to comparator 58 using a twisted wire pair 60 inside a shielded cable 62. Note that the photodiodes shown in the embodiments of FIG. 5 and FIG. 6 operate in the reverse bias mode (more sensitive to lower light levels).

Figure 7:
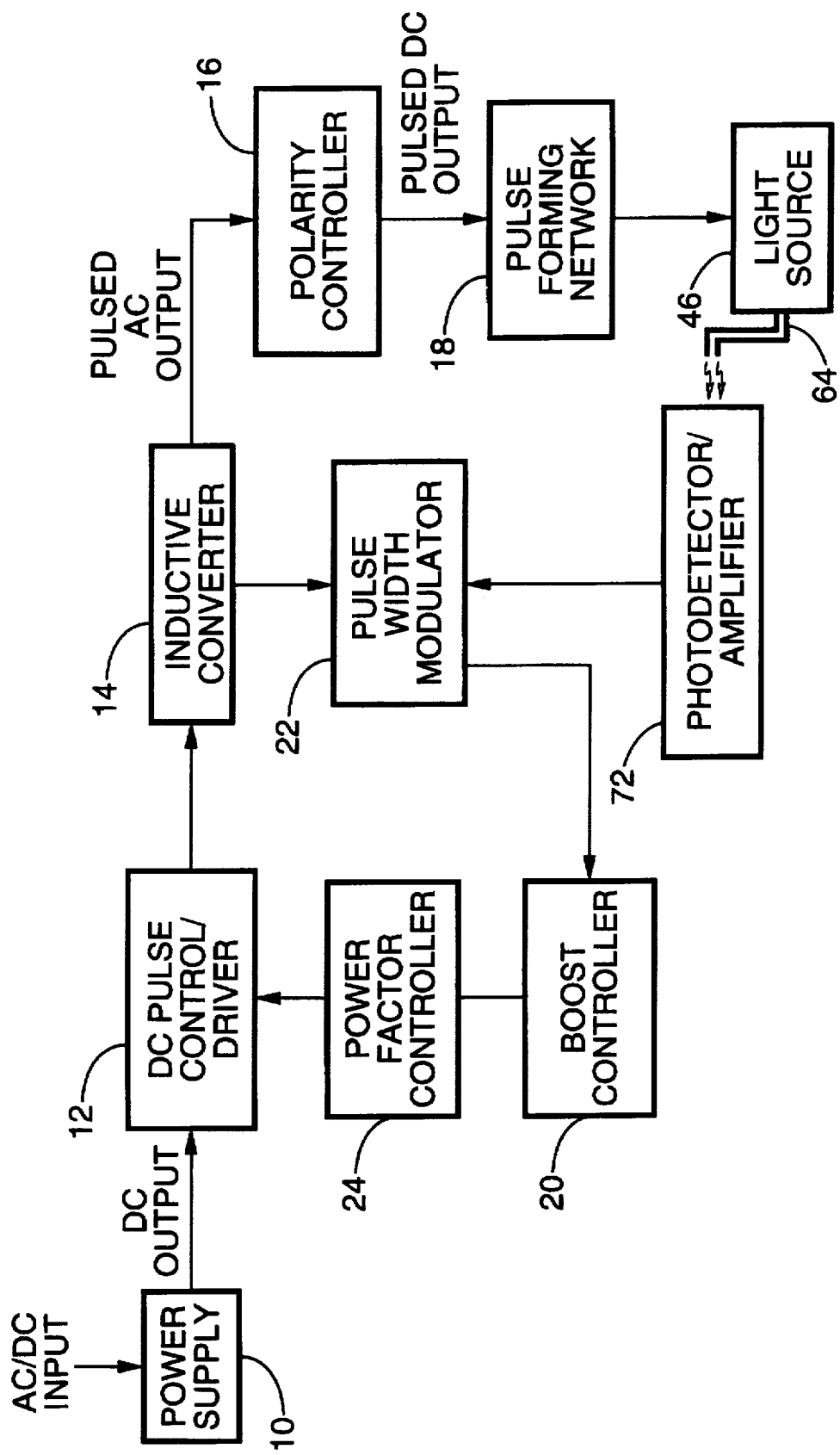
FIG. 7 is a functional block diagram of an alternative embodiment of the apparatus shown in FIG. 1 configured for sensing photon energy output to provide a constant light source in variable environmental conditions.
Figure 8:
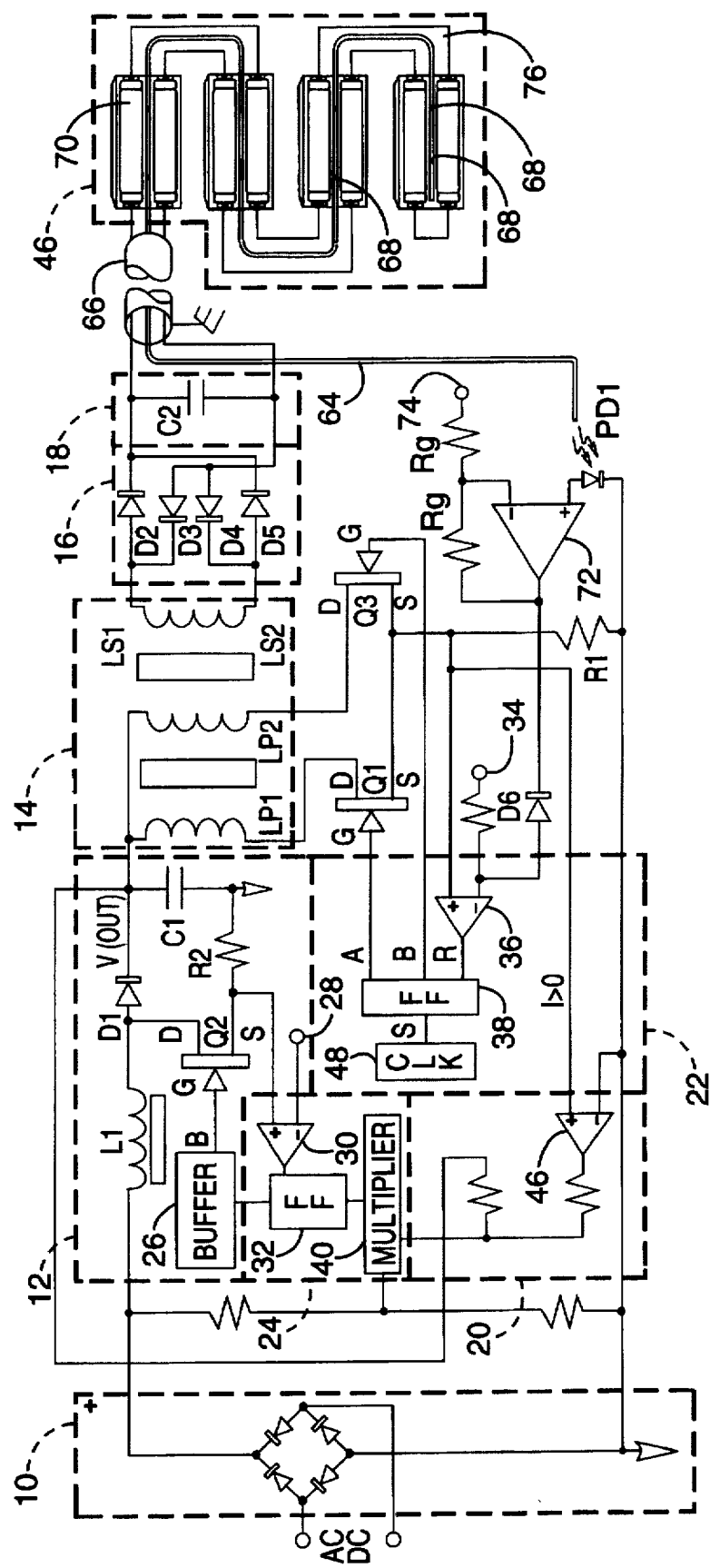
FIG. 8 is a schematic diagram of an embodiment of the apparatus shown in FIG. 7.

Referring now to FIG. 7 and FIG. 8, a fiber optic cable 64 is shown running inside a shielded cable or conduit 66 along with the pulsed high voltage DC wires to a remotely located light source 46. Fiber optic cable 64 includes manifold inputs 68 summing together the light output from all of the ends of the tubes 70 in light source 46. The summed light from the ends of the tubes feeds photodiode PD 1 and amplifier 72 for the purpose of controlling the output secondary current, simultaneously increasing the pulse voltage and thus closing the loop on a constant light source. For example, by using an ultraviolet (blue) filter on PD1 the high voltage DC pulse may be current limited by ultraviolet photon energy at 420 nm to provide a constant light output at that remote site regardless of changing environmental conditions. Other wavelengths can be similarly selected by appropriate filters on the photodiode. It will be appreciated that, by using such filters on the photodiodes, ambient light is rejected. Note also, that PD1 is shown in the voltaic mode for illustrative purposes, but that the light energy to be monitored would determine whether PD1 is forward or reverse biased.

In the embodiment of FIG. 8, the photon energy output from the ends of all of the tubes 70 is summed so as to provide bias to the non-inverting input of amplifier 72 by means of photodiode PD1. The light energy (e.g., photon energy @ 420 nm) causes PD1 to conduct, thereby lowering the internally biased non-inverting input voltage until it crosses the reference voltage point set by voltage applied to input 74 which is the inverting input. This causes the output to switch low (Rg sets gain) so as to forward bias D6 and lower the reference voltage applied to pulse width modulator 22 at input 34. As a result, secondary current and photon energy output decreases to the point of regulation, providing an electro-optical closed loop system. This allows for a wide temperature and source input voltage range, while maintaining the manufacturer's specified light output through constant ionization modulation. Preferably, the fiber optic cable 64 is contained within an opaque jacket 76 between the light tubes 70.

Figure 9:
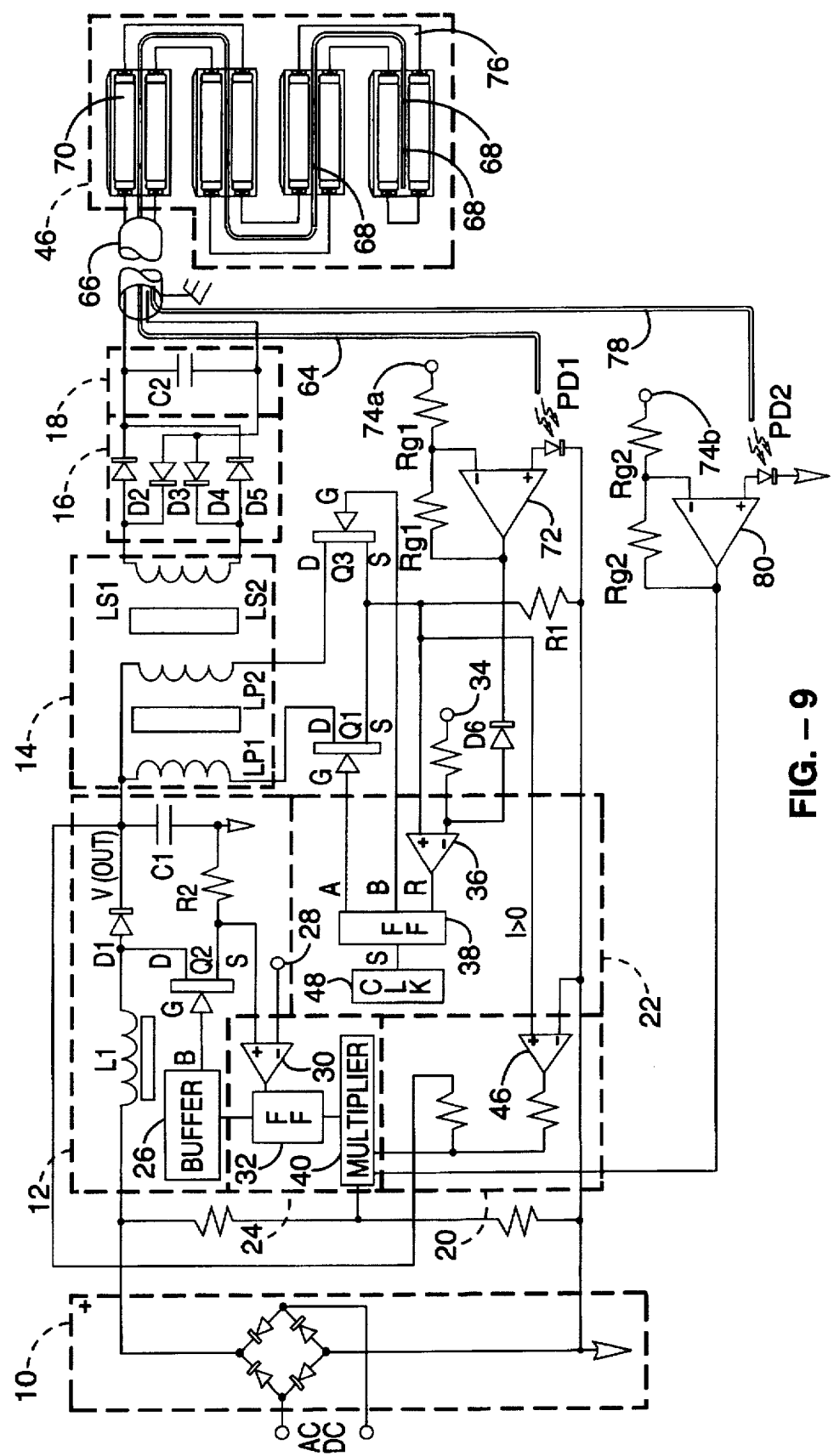
FIG. 9 is a schematic diagram of an alternative embodiment of the apparatus shown in FIG. 8 configured for sensing photon energy output at multiple wavelengths.

FIG. 9 shows an alternative embodiment of the apparatus shown in FIG. 8 which employs two fiber optic cables, one for ultraviolet light at 420 nm and the other for infrared light at 1100 nm. Both cables are white on the ends and contained inside of opaque jacket 76 as before, and opened to form manifold inputs 68 in areas corresponding to the ends of the light tubes 70 as described with regard to the embodiment shown in FIG. 6. However, the cables have different diameters; that is, the ultraviolet cable 64 is smaller than the infrared cable 78. As can be seen, the fiber optic cables are run along with high voltage wires and ground to a remotely located light source 46. Ultraviolet cable 64 feeds PD1 to control light output as in the embodiment of FIG. 8, while infrared cable 78 feed PD2 to control the boost and regulation of the pulses.

In the embodiment of FIG. 9, the output of the 1100 nm amplifier 80 is connected to multiplier 40. When the output of the 1100 nm amplifier 80 goes low, multiplier 40 causes the pulse amplitude to decrease to the point of regulation forming a second electro-optical closed loop system based on temperature in the 1100 mn wavelength. Thus, as light source temperature increases, the pulse amplitude is lowered to the point of regulation. This occurs when the pulse voltage cannot be lower without causing the photon energy output in the 1100 nm wavelength to diminish. Consequently at that point of regulation, pulse width modulator 20 is providing for maximum pulse width for maintaining a constant secondary current thus reducing switching losses and stress to a minimum. This also allows for lower operating temperatures within the power switching circuits, further increasing efficiency. By utilizing the ultraviolet and infrared peak characteristics of plasma (gas in the ionized state) under direct current control, it is possible to minimize the effect of external light sources in the visible light frequency spectrum causing the invention to decrease ionization current (dimming).

Figure 10:
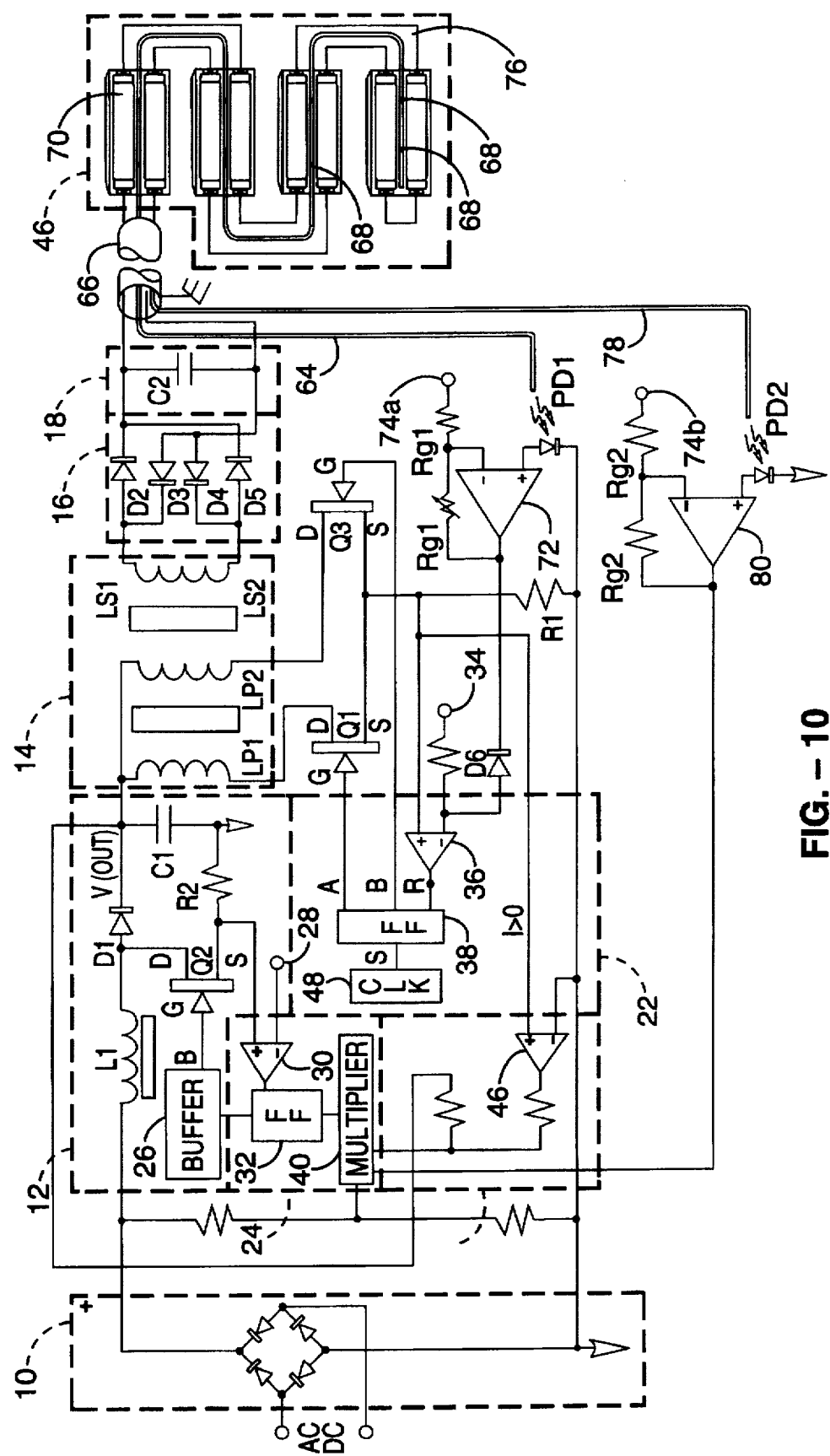
FIG. 10 is a schematic diagram of an alternative embodiment of the apparatus shown in FIG. 8 or FIG. 9 with a programmable dimming capability.

FIG. 10 illustrates how an electronic dimming capability can be added to the embodiment shown FIG. 8 or FIG. 9. As pulse width modulator 20 decreases secondary direct current flow in response to a gain increase in the ultraviolet amplifier 72, the light output is decreased in response to the increase in gain. Thus, by reducing ionization current, dimming will take place and the light output will remain constant, impervious to changing environmental conditions such as temperature, input source voltage and ambient light. This is accomplished using a programmable or variable gain amplifier as ultraviolet amplifier 72.

Figure 11:
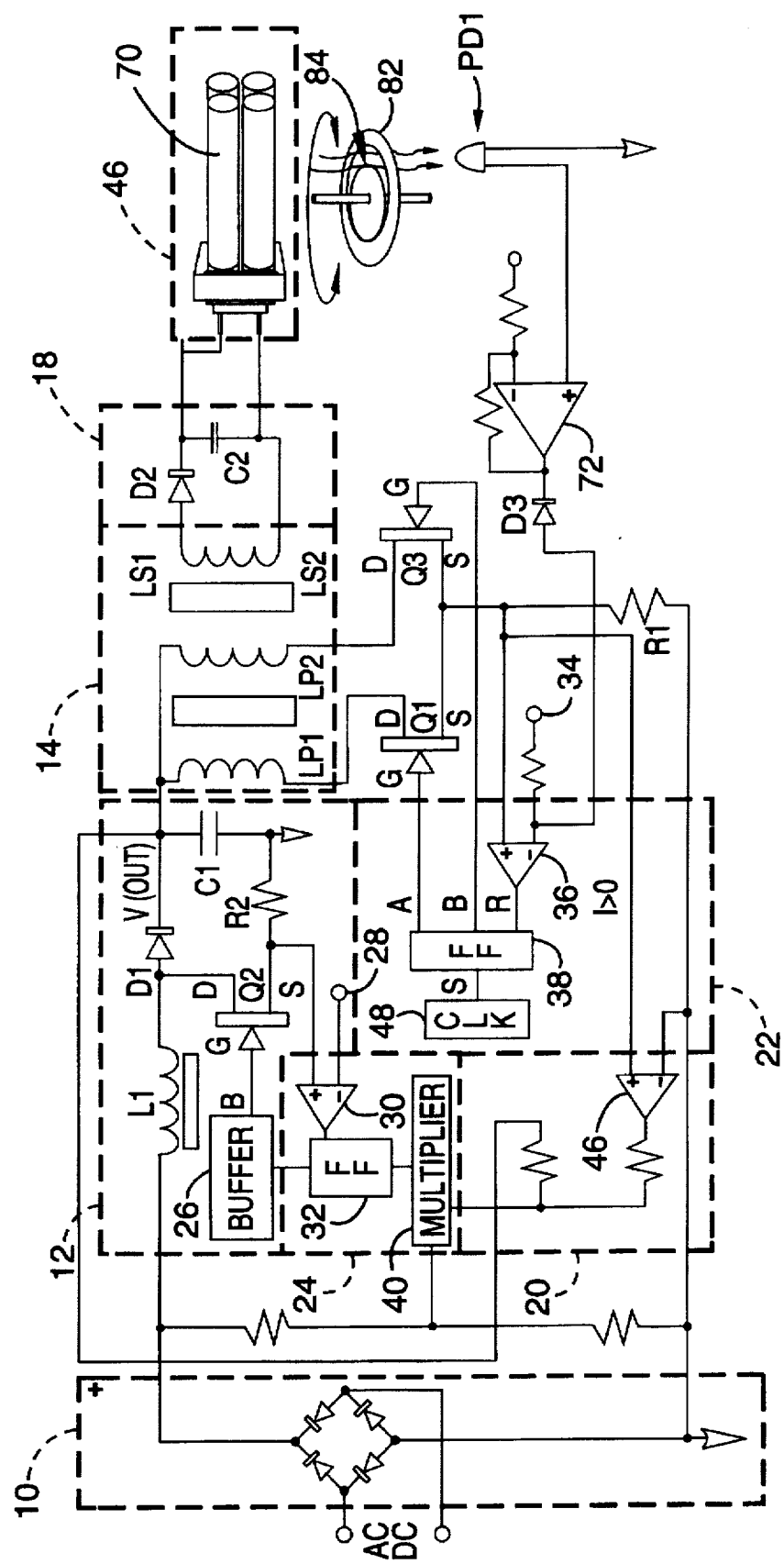
FIG. 11 is a schematic diagram illustrating a mechanical dimming mechanism which can be employed with the present invention.

Referring now to FIG. 11, there is shown a basic mechanical means of dimming light output which can be employed in any of the embodiments described herein. In FIG. 11, a mechanical interrupter 82, such as a rotating wheel or the like having an aperture 84, is used to vary the amount of light which reaches photodiode PD 1. This opto-mechanical means of dimming the light output results from the variation of light energy to PD1 through aperture 84 causing a relative change in the current to amplifier 72.

With some applications, there may be a need for a minimum ambient lighting condition to exist within an area being lighted. To accommodate such a condition, ambient light can be mixed with the light source output through a clear window of PD1 instead of employing wavelength specific filters which would filter out ambient light. The opto-mechanical means of dimming the light output shown in FIG. 11 can be employed to vary the optically clear window open area to allow more or less combined light to pass through to photodiode PD1. Typically the light source current would be zero in daylight conditions and increase to the minimum set point in dark conditions, thus providing for a constant minimum light source impervious to changing environmental conditions such as temperature and input source voltage.

Figure 12:
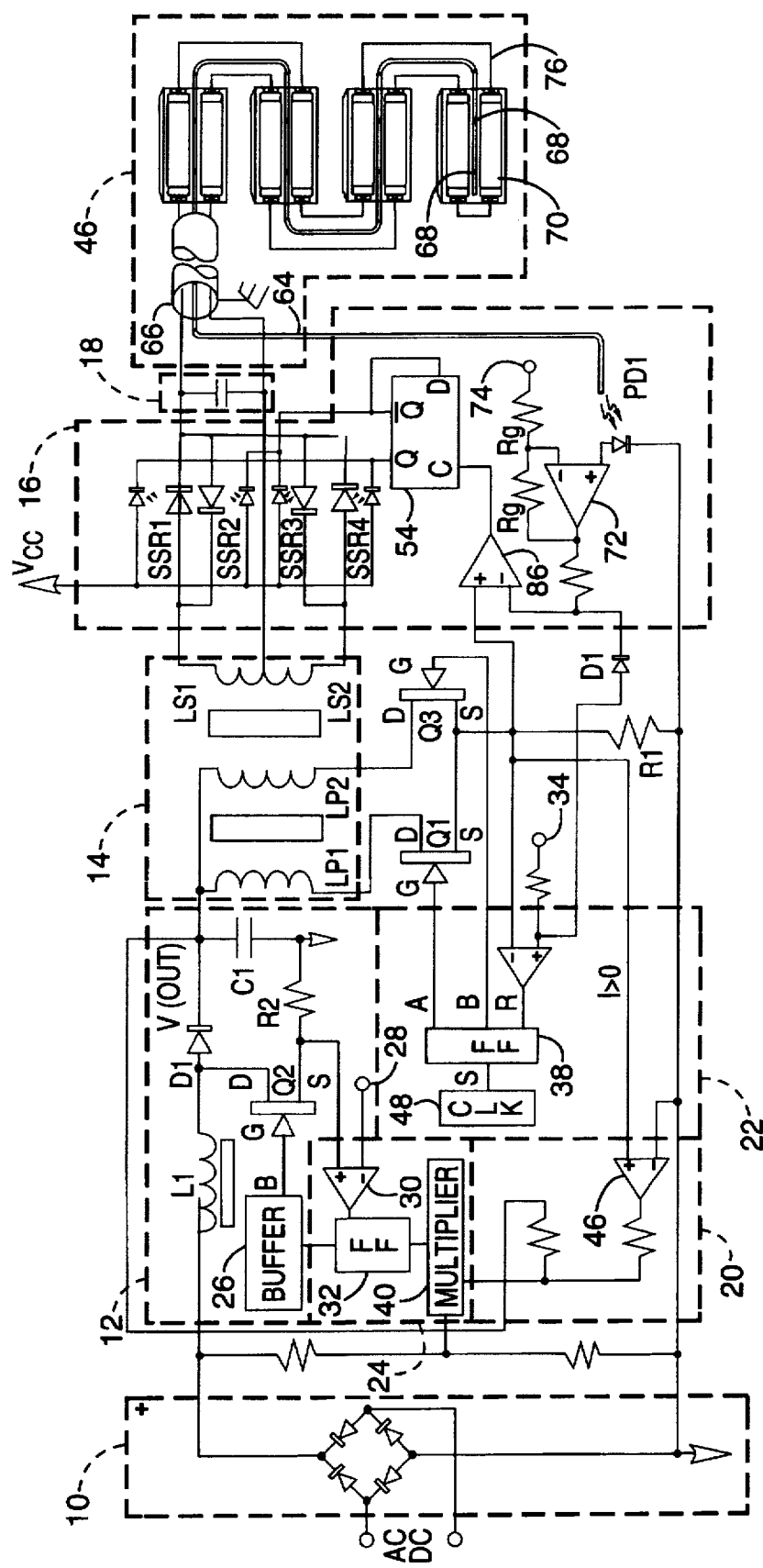
FIG. 12 is a schematic diagram of an embodiment of the present invention configured for automatic dark spot sensing and polarity reversal.

Referring to FIG. 12, dark areas in any of the light source 46 tubes 70 may be detected and polarity reversal automatically implemented by combining the polarity reversal configuration of FIG. 5 with the fiber optics of FIG. 8 as shown. Comparison is made between the sources of Q1 and Q3 and the output of amplifier 72, which should be low at all times including dimming, relative to the amount of current (set to the manufacturer's specified lamp current) flowing to pulse width modulator 20. When the inverting input of comparator 86 goes high, the output switches to low causing the "D"flip flop 54 to toggle on the negative edge (clock input so as to generate a polarity reversal cycle which alternates the polarity of the pulsed high voltage DC to light source 46. In typically less than one hour, normal light output levels are restored causing the output of amplifier 72 to switch low setting flip flop 54 to toggle on the next negative clock edge.

Figure 13A:
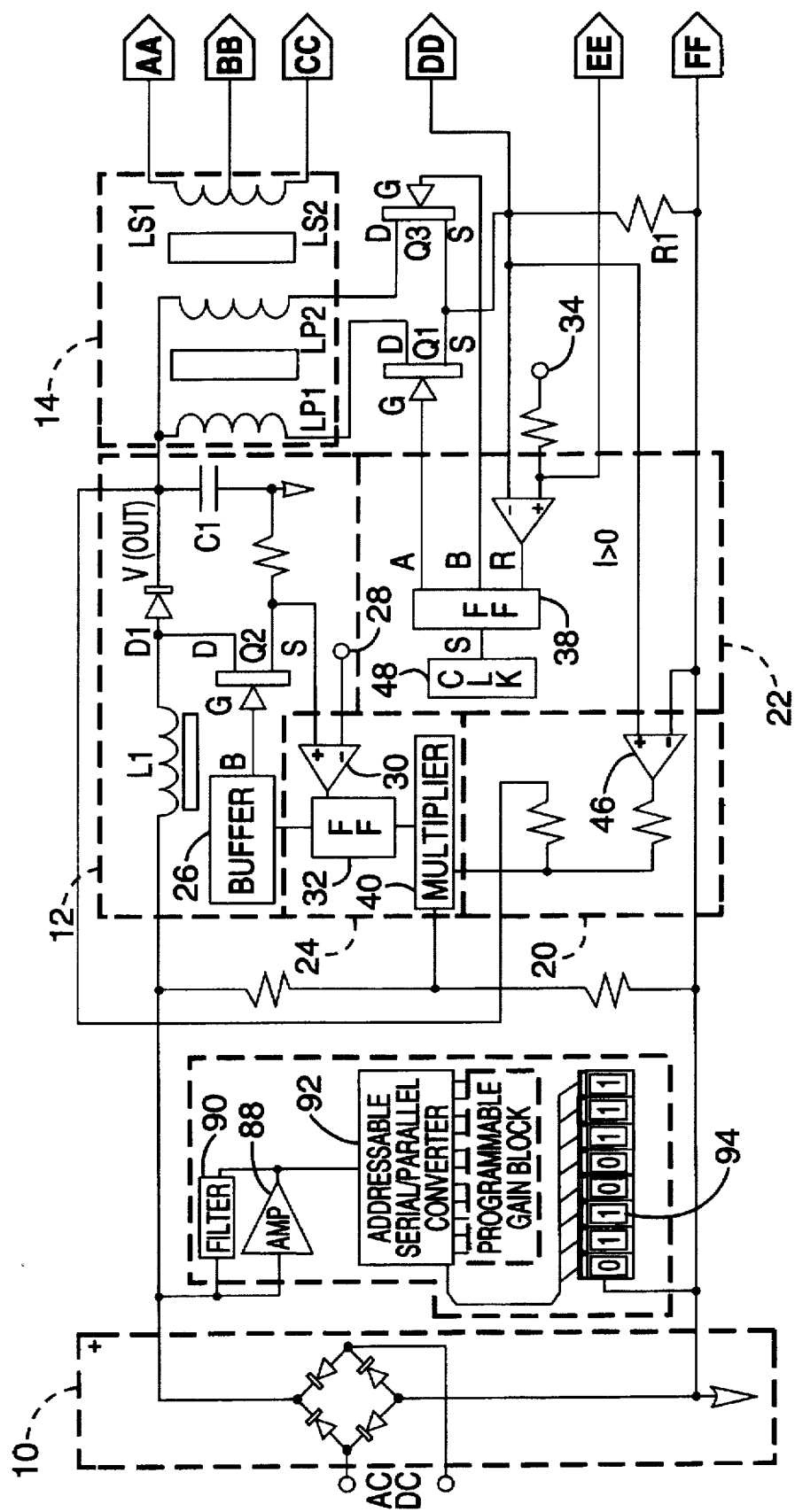
FIG. 13A and 13B is a schematic diagram of an alternative embodiment of the apparatus shown in FIG. 12 wherein the output pulses are controlled by a digital code transmitted over the power lines.
Figure 13B:
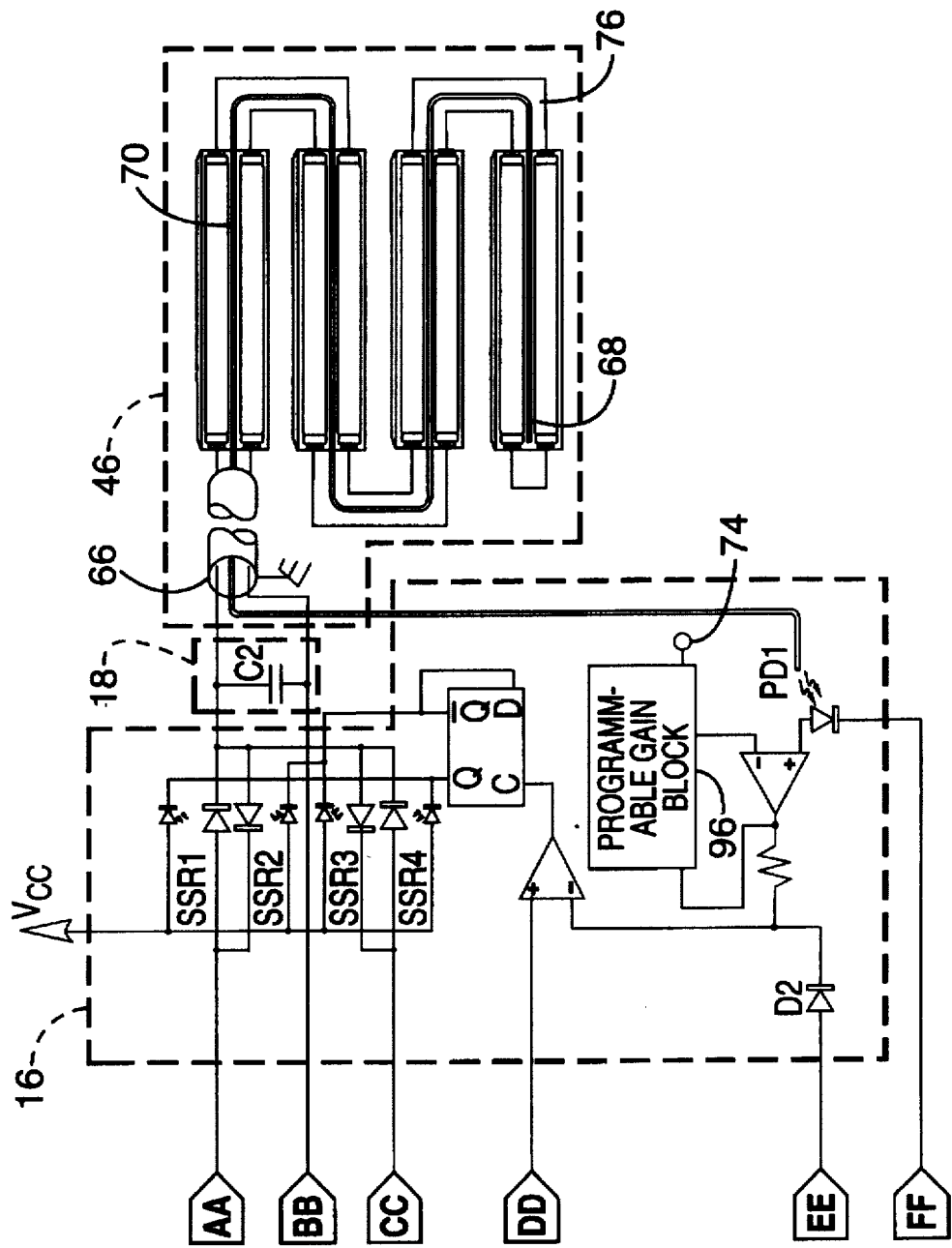

FIG. 13 reflects a modification to the configuration shown in FIG. 12 which generally illustrates the versatility of the various embodiments described herein to be remotely controlled using, for example, power line communications. For example, a digital signal containing one or more digital words is read from the AC line (source input) by a high gain, high frequency operational amplifier 88 and filter 90 which provide a square wave output and thus a digital serial output to an addressable serial to parallel convertor 92 which compares the address byte of the word to that which is set in an addressable switch register 94. When there is a match, a write data pulse is generated to the load data latch input of the programmable gain block 96, such as a digital resistor integrated circuit with nonvolatile memory, thus latching the second byte as data, and in turn setting the gain for amplifier 72, where minimum gain correlates to minimum feedback to current limits and maximum light output and, conversely, high gain provides minimum light output. By using a nonvolatile digital resistor integrated circuit for programmable gain block 96, gain set remains constant even with power off. Additionally, this embodiment could provide for polarity reversal based on a particular digital signal being sent, such as all zeros.

Figure 15:
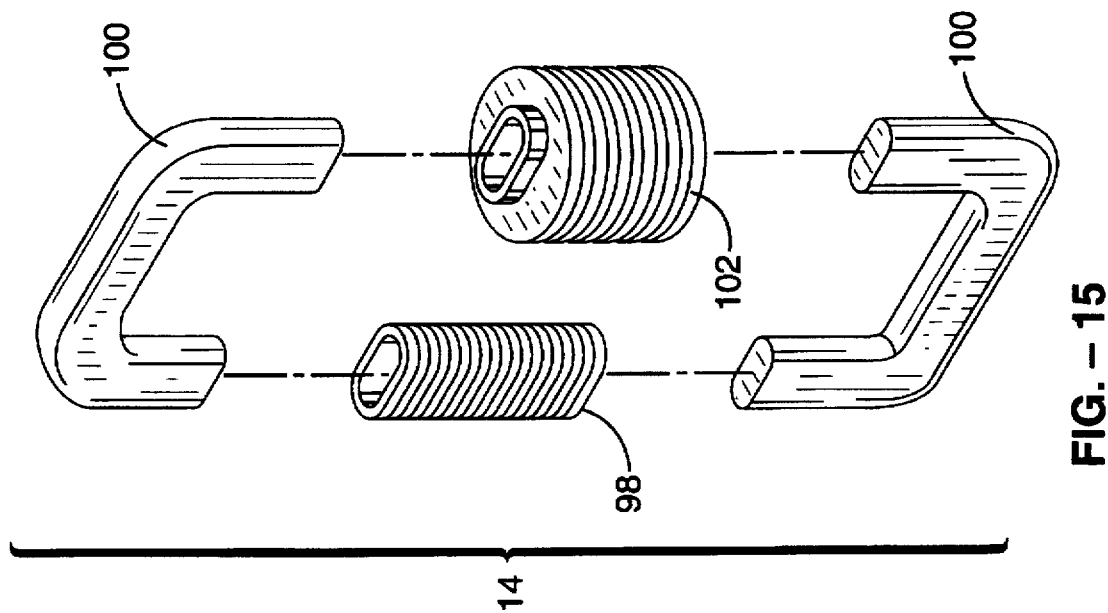
FIG. 15 is an assembled side elevation view of the inductive voltage converter shown in FIG. 14.
Figure 14:
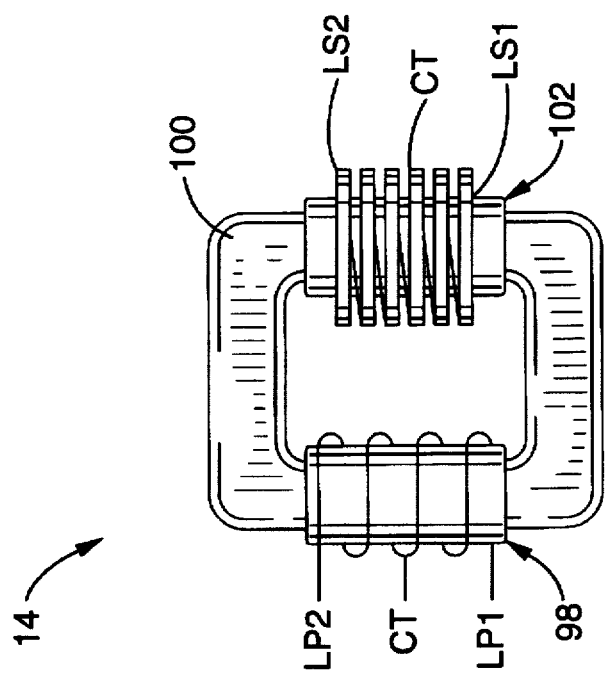
FIG. 14 is an exploded perspective view of an embodiment of the inductive voltage converter utilized in the present invention.

Referring now to FIG. 14 and FIG. 15, in the push-pull configuration previously described, inductive converter 14 preferably comprises a conventional bifiler wound bobbin 98 for the primary inductor LP1 and LP2, a conventional core 100, and a conventional air core high frequency RF type 5 PI universal wound choke 102 as for the secondary inductor LS1 and LS2 as shown. Such a configuration provides for reduced inter-capacitance, allows for faster rise and fall times, and lower operating temperatures and increased efficiency. In a flyback configuration as described in FIG. 2, core 100 can be gapped for flyback. Otherwise, in the push-pull configuration described herein, core 100 is not gapped.

Accordingly, it will be appreciated that the present invention comprises lighting system for powering cold cathode gas type light sources which do not use filaments or heaters, such as cold cathode fluorescent lights, with direct current voltage pulses incurrent voltage pulses instead of alternating curren amplitude is variable, with a higher voltage pulse applied prior to ionization. Upon ionization, the impedance of the gas decreases and the pulse amplitude is decreased to a level sufficient to maintain ionization. At the same time, pulse width is increased so as to produce a constant light output. As a result of using a direct current pulses, dark spots which form at the ends of fluorescent tubes can be eliminated by reversing the polarity of the pulses. Further, by sensing photon emission and adjusting pulse width and amplitude in response, the apparatus effective provides for a constant photon power supply.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:
1. A cold cathode lighting system, comprising:
   (a) a lamp circuit, said lamp circuit including a plurality of cold cathode lamps electrically connected in series and optically in parallel, each said lamp including an ionizing gas;
   (b) means for generating electrical direct current high voltage pulses of sufficient amplitude and energy to cause said gas to ionize, said pulses having amplitude and width;
   (c) means for applying said direct current pulses to said lamps with a non-alternating polarity, wherein the amplitude of said pulses is decreased upon ionization of said gas and wherein the width of said pulses is increased upon ionization of said gas; and
   (d) means for sensing photon energy released by said lamps in the ultraviolet spectrum, for varying pulse width according to the amount of photon energy released by said lamps, and for providing a constant photon output from said lamps; and
   (e) means for sensing thermal energy released by said lamps in the infrared spectrum and varying pulse amplitude according to the intensity of thermal energy released by said lamps.

2. An lighting system as recited in claim 1 further comprising means for reversing polarity of said pulses to said lamps to reduce dark areas in said lamps resulting from said non-alternating polarity direct current high voltage pulses.

3. A lighting system as recited in claim 1, further comprising means for controlling said pulses with a digital signal.

4. A cold cathode fluorescent lighting system, comprising:
   (a) a lamp circuit, said lamp circuit including a plurality of cold cathode fluorescent lamps electrically connected in series and optically in parallel, each said lamp including an ionizing gas;
   (b) pulse generating means for generating electrical direct current high voltage pulses, said pulses having amplitude and width;
   (c) means for applying said high voltage direct current pulses to said lamps with a non-alternating polarity, said pulses having sufficient amplitude and energy to cause ionization of the gas within said lamps, wherein the amplitude of said pulses is decreased upon ionization of said gas and wherein the width of said pulses is increased upon ionization of said gas; and
   (d) means for sensing photon energy released by said lamps in the ultraviolet spectrum, for varying pulse width according to the amount of photon energy released by said lamps, and for providing a constant photon output from said lamps; and
   (e) means for sensing thermal energy released by said lamps in the infrared spectrum and varying pulse amplitude according to the intensity of thermal energy released by said lamps.

5. A lighting system as recited in claim 4, further comprising means for reversing polarity of said pulses to reduce dark areas in said lamps resulting from said non-alternating polarity direct current high voltage pulses.

6. A cold cathode fluorescent lighting system, comprising:
   (a) a lamp circuit, said lamp circuit including a plurality of cold cathode fluorescent lamps electrically connected in series and optically in parallel, each said lamp including an ionizing gas;
   (b) pulse generating means for generating electrical direct current high voltage pulses, said pulses having amplitude and width;

(c) means for applying said high voltage direct current pulses to said lamps with a non-alternating polarity, said pulses having sufficient amplitude and energy to cause ionization of the gas within said lamps, wherein the amplitude of said pulses is decreased upon ionization of said gas and wherein the width of said pulses is increased upon ionization of said gas;

(d) means for reversing polarity of said pulses to reduce dark areas in said lamps resulting from said non-alternating polarity direct current high voltage pulses; and (e) means for sensing photon energy released by said lamps in the ultraviolet spectrum, for varying pulse width according to the amount of photon energy released by said lamps and for providing a constant photon output from said lamp; and (f) means for sensing thermal energy released by said lamps in the infrared spectrum and varying pulse amplitude according to the intensity of thermal energy released by said lamps.

* * * * *

UNITED STATES PATENT AND TRADEMARK OFFICE
CERTIFICATE OF CORRECTION

PATENT NO. : 5,698,952

DATED : December 16, 1997

INVENTOR(S) : Russell T. Stebbins

It is certified that error appears in the above-indentified patent and that said Letters Patent is hereby corrected as shown below:

Column 1, line 13, change "pertaim" to --pertains--.

Column 1, line 15, change "currein" to --current--.

Column 1, line 19, change "tramparent" to --transparent--.

Column 1, line 21, change "currein" to --current--.

Column 4, line 30, change "DESCRIFFON" to --DESCRIPTION--.

Column 5, line 40, after "A" insert space.

Column 6, line 48, after "As" insert --a--.

Column 7, line 60, change "florescent" to --fluorescent--.

UNITED STATES PATENT AND TRADEMARK OFFICE
CERTIFICATE OF CORRECTION

PATENT NO. : 5,698,952
DATED : December 16, 1997
INVENTOR(S) : Russell T. Stebbins It is certified that error appears in the above-indentified patent and that said Letters Patent is hereby corrected as shown below:

Column 11, line 6, after "input" insert --)--.

Column 11, line 47, after "comprises" insert "a".

Column 11, line 50, delete "incurrent voltage pulses".

Column 11, line 51, change "curren" to "current".

Column 11, line 52, before "amplitude" insert --as in conventional systems. The pulse--

Column 11, line 60, change "effective" to "effectively".

Signed and Sealed this

Nineteenth Day of May, 1998

*Attest:*

BRUCE LEHMAN

*Attesting Officer*     *Commissioner of Patents and Trademarks*